United States Patent
Numajiri

(10) Patent No.: US 8,491,256 B2
(45) Date of Patent: Jul. 23, 2013

(54) PITCH DRIVE DEVICE OF WIND TURBINE GENERATOR AND WIND TURBINE GENERATOR

(75) Inventor: Tomohiro Numajiri, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1065 days.

(21) Appl. No.: 12/448,504

(22) PCT Filed: Dec. 19, 2008

(86) PCT No.: PCT/JP2008/073234
§ 371 (c)(1),
(2), (4) Date: Jun. 23, 2009

(87) PCT Pub. No.: WO2010/070768
PCT Pub. Date: Jun. 24, 2010

(65) Prior Publication Data
US 2010/0276932 A1   Nov. 4, 2010

(51) Int. Cl.
*F04D 29/56*   (2006.01)
(52) U.S. Cl.
USPC ............................................ 415/160; 416/155
(58) Field of Classification Search
USPC ................ 415/156, 160, 229; 416/155, 156, 416/157 B, 157 R, 158, 500
See application file for complete search history.

(56) References Cited

U.S. PATENT DOCUMENTS

| | | | |
|---|---|---|---|
| 5,118,256 A * | 6/1992 | Violette et al. | 416/134 R |
| 2008/0292463 A1* | 11/2008 | Munch | 416/155 |
| 2010/0021304 A1* | 1/2010 | Raes et al. | 416/155 |

FOREIGN PATENT DOCUMENTS

| | | |
|---|---|---|
| JP | H05-149237 | 6/1993 |
| WO | WO2008/068373 | 6/2008 |
| WO | WO2008/146557 | 12/2008 |

OTHER PUBLICATIONS

The State Intellectual Property Office of the People's Republic of China, Notification for Patent Registration Formalities, Jun. 6, 2012.

* cited by examiner

*Primary Examiner* — Dwayne J White
(74) *Attorney, Agent, or Firm* — Manabu Kanesaka; Kenneth M. Berner; Benjamin J. Hauptman

(57) ABSTRACT

A pitch drive device of a wind turbine generator and a wind turbine generator that have simple and inexpensive structures and that are capable of preventing a decrease in the reliability of the pitch drive device are provided. There is provided a cylinder (12) configured to change a pitch angle by driving a wind-turbine rotary blade (6) to turn around an axis with respect to a rotor head (4); and a cylinder bearing (14) configured to support, in a turnable manner, a trunnion (16) extending from the cylinder (12) substantially parallel the axis of the wind-turbine rotary blade (6), wherein anti-vibration rubber (21) configured to elastically support the trunnion (16) is provided on a support section configured to support the trunnion (16) of the cylinder bearing (14).

16 Claims, 4 Drawing Sheets

PITCH DRIVE DEVICE OF WIND TURBINE GENERATOR AND WIND TURBINE GENERATOR

TECHNICAL FIELD

The present invention relates to a pitch drive device of a wind turbine generator and to a wind turbine generator.

BACKGROUND ART

Known wind turbines used for wind turbine generator include wind turbines in which the pitch angle of wind-turbine rotary blades is fixed and wind turbines in which the pitch angle is variable.

As a mechanism for changing the pitch angle of the wind-turbine rotary blades, as mentioned above, for example, a mechanism for converting linear movement of a rod of a hydraulic cylinder to rotation around the axis of the wind-turbine rotary blades is known (for example, refer to Patent Document 1).

In addition to the mechanism described in the above-mentioned Patent Document 1, there is a known variable-pitch structure in which a hydraulic cylinder is supported by a trunnion structure at a rotor head in a such a manner that the hydraulic cylinder rotates around a single axis and in which an end of a rod is supported in such a manner that it rotates around a single axis of a wind-turbine rotary blade.

In this variable-pitch structure, the hydraulic cylinder and the rod are supported in a plane perpendicular to the axis of the wind-turbine rotary blades in such a manner that they are turnable around the trunnion structure, i.e., pivot around a single axis. Since the end of the rod is supported at a position away from the axis of the wind-turbine rotary blades, the linear movement of the rod was converted to rotation around the axis of the wind-turbine rotary blades.

Patent Document 1:
Japanese Unexamined Patent Application, Publication No. HEI-5-149237

DISCLOSURE OF INVENTION

However, with a pitch driving mechanism enabling such single-axis pivoting movement, there was a risk that, when the strokes of the hydraulic cylinder and the rod are increased for reasons such as a size increase in the wind-power facility, the structure of the attachment section between the trunnion structure and the hydraulic cylinder easily deforms, and the load acting around the axis orthogonal to the rotational axis of the trunnion structure increases.

Furthermore, there was a risk that the force acting upon the large wind-turbine rotary blades may cause deformation of the roots of the wind-turbine rotary blades and the rotor head itself, and thus, the load around the axis orthogonal to the rotational axis line of the trunnion structure increases.

When the load increases in this way, the seal of the hydraulic cylinder becomes worn, the structural load on the trunnion structure increases, and thus the long-term reliability of the pitch driving mechanism may be impaired.

In addition to the above-described issues with the pitch driving mechanism, the pitch driving mechanism must be assembled with caution because there is a strict requirement for parallelism of the rotating surfaces of the wind-turbine rotary blades in order to prevent wear, etc. of the seal of the hydraulic cylinder.

To prevent this, it is possible to provide support centered on a trunnion structure in a turnable manner in a plane perpendicular to the axis of a wind-turbine rotary blade, as well as support centered on an additional trunnion structure in a turnable manner on a plane parallel to the axis of the wind-turbine rotary blade, i.e., to enable two-axis pivoting movement.

In this way, the structure supporting the hydraulic cylinder becomes complicated, and thus the size of the rotor head may increase, and costs may increase.

The present invention has been conceived in light of the above-described problems, and an object thereof is to provide a pitch drive device of a wind turbine generator and a wind turbine generator that have simple and inexpensive structures and that are capable of preventing a decrease in the reliability of the pitch drive device.

To achieve the above-described objective, the present invention provides the following solutions.

A first aspect of the present invention is a pitch drive device of a wind turbine generator including a cylinder configured to change a pitch angle by driving a wind-turbine rotary blade to turn around an axis with respect to a rotor head; and a cylinder bearing configured to support, in a turnable manner, a trunnion extending from the cylinder substantially parallel to the axis of the wind-turbine rotary blade, wherein an elastic support member configured to elastically support the trunnion is provided on a support section configured to support the trunnion of the cylinder bearing.

According to this aspect, in the cylinder, a trunnion that extends substantially parallel to the axis of the wind-turbine rotary blade is supported in a turnable manner by a cylinder bearing. In other words, the cylinder is supported in such a manner that it is turnable around a turning axis substantially parallel to the axis of the wind-turbine rotary blades. In this way, since the end section of the rod extending from and retracting into the cylinder is supported at a position away from the axis of the wind-turbine rotary blade, the linear movement of the rod (extension and retraction of the rod) is converted to rotation around the axis of the wind-turbine rotary blade, thereby changing the pitch angle of the wind-turbine rotary blade, i.e., enabling adjustment.

At this time, since an elastic support member that elastically supports the trunnion is provided on the support section supporting the trunnion of the cylinder bearing, for example, the force acting on the cylinder, i.e., trunnion, in the direction intersecting the axis of the trunnion due to warpage generated at the attachment section of the rotor head and the wind-turbine rotary blade by the wind-turbine rotary blade receiving wind power is absorbed by the deformation of the elastic member.

In this way, since the force acting in the bending direction of the cylinder is absorbed by the elastic member, Wear progression of the sealing section, etc. of the cylinder can be prevented, and a reduction in reliability of the pitch drive device can be prevented.

Moreover, since the elastic support member that elastically supports the trunnion is merely provided at the support section of the cylinder bearing that supports the trunnion, compared with one using two pairs of trunnions, simplification and size reduction of the structure are possible, and the manufacturing cost can be reduced.

In the above-described aspect, anti-vibration rubber may be used as the elastic support member.

In this way, the force acting on the cylinder, i.e., trunnion, in the direction intersecting the axis of the trunnion due to warpage generated at the attachment section of the rotor head and the wind-turbine rotary blade is absorbed by deformation of the anti-vibration rubber. Therefore, wear progression of the sealing section, etc. of the cylinder can be prevented, and a reduction in reliability of the pitch drive device can be prevented.

In the above-described aspect, a rubber surface of the anti-vibration rubber may be inclined such that the diameter increases outward.

Since the trunnion moves in such a manner that the axial center of the trunnion inclines due to warpage generated at the attachment section of the rotor head and the wind-turbine rotary blade, the outer end of the trunnion moves the most. In other words, the movement of the trunnion gradually increases from the inside to the outside. Therefore, the force from the trunnion acting upon the rubber surface of the anti-vibration rubber inclines more inward than the direction orthogonal to the axis of the trunnion.

Since the rubber surface of the anti-vibration rubber inclines such that the diameter increases outward, the force inclining inward and acting upon the rubber surface of the anti-vibration rubber from the trunnion can be supported efficiently.

Since the component of force in the direction along the rubber surface of the anti-vibration rubber decreases, the shearing force acting upon the anti-vibration rubber can be reduced, and the durability of the anti-vibration rubber can be improved.

It is desirable to set the inclination angle of the rubber surface of the anti-vibration rubber to an angle substantially orthogonal to the acting direction of the resultant force at the trunnion in view of various loads on the cylinder.

Since the acting direction of the resultant force changes when the load condition changes, an intermediate value of the acting direction of the expected resultant force may be used or an acting direction expected to be most frequent may be used.

In the above-described aspect, it is preferable that the outward movement of the outer end of the trunnion be restricted by a thrust receiving member.

Since the cylinder revolves around the axial center of the rotor head due to the rotation of the rotor head, the cylinder rotates once around its axis during one revolution. Therefore, if there is a gap between the trunnion and cylinder bearing, the cylinder (trunnion) periodically moves in the gap, causing the trunnion and the cylinder to periodically collide.

Such periodical collision of the trunnion and the cylinder bearing generates noise, and a collision force acts upon the elastic member.

This is significant in the axis direction in which the gap is large compared with that in the direction intersecting the axis direction in which support is provided by the support section in a relatively dense manner.

In this aspect, since the outward movement of the outer end of the trunnion is restricted by a thrust receiving member, even when there is gap between the trunnion (cylinder) and the cylinder bearing, the trunnion (cylinder) can be prevented from moving in the axial direction of the cylinder bearing. Therefore, since the periodical collision of the trunnion and the cylinder bearing due to the rotation of the rotor head can be prevented, the generation of noise can be prevented, and thus the durability of the elastic member can be improved.

A second aspect of the present invention is a wind turbine generator including a plurality of wind-turbine rotary blades configured to receive wind power; a rotor head configured to support the wind-turbine rotary blades in such a manner that they turn around an axis of the wind-turbine rotary blades and to be driven to turn by the wind-turbine rotary blades; a pitch drive device according to the first aspect; and power facility configured to perform power generation by the rotation of the rotor head.

According to this aspect, by using the pitch drive device according to the first aspect, the reliability of the pitch drive device can be prevented from being impaired, and thus the reliability of wind turbine generator can be prevented from being impaired.

According to the present invention, since an elastic support member that elastically supports the trunnion is provided on a support section that supports the trunnion of the cylinder bearing, the force acting in the bending direction of the cylinder can be absorbed by the elastic member. In this way, the reliability of the pitch drive device can be prevented from being impaired.

Since the elastic support member that elastically supports the trunnion is only provided at the support section for supporting the trunnion of the cylinder bearing, compared with one using two pairs of trunnions, simplification and size reduction of the structure are possible, and the manufacturing cost can be reduced.

EXPLANATION OF REFERENCE SIGNS

Figure 1:
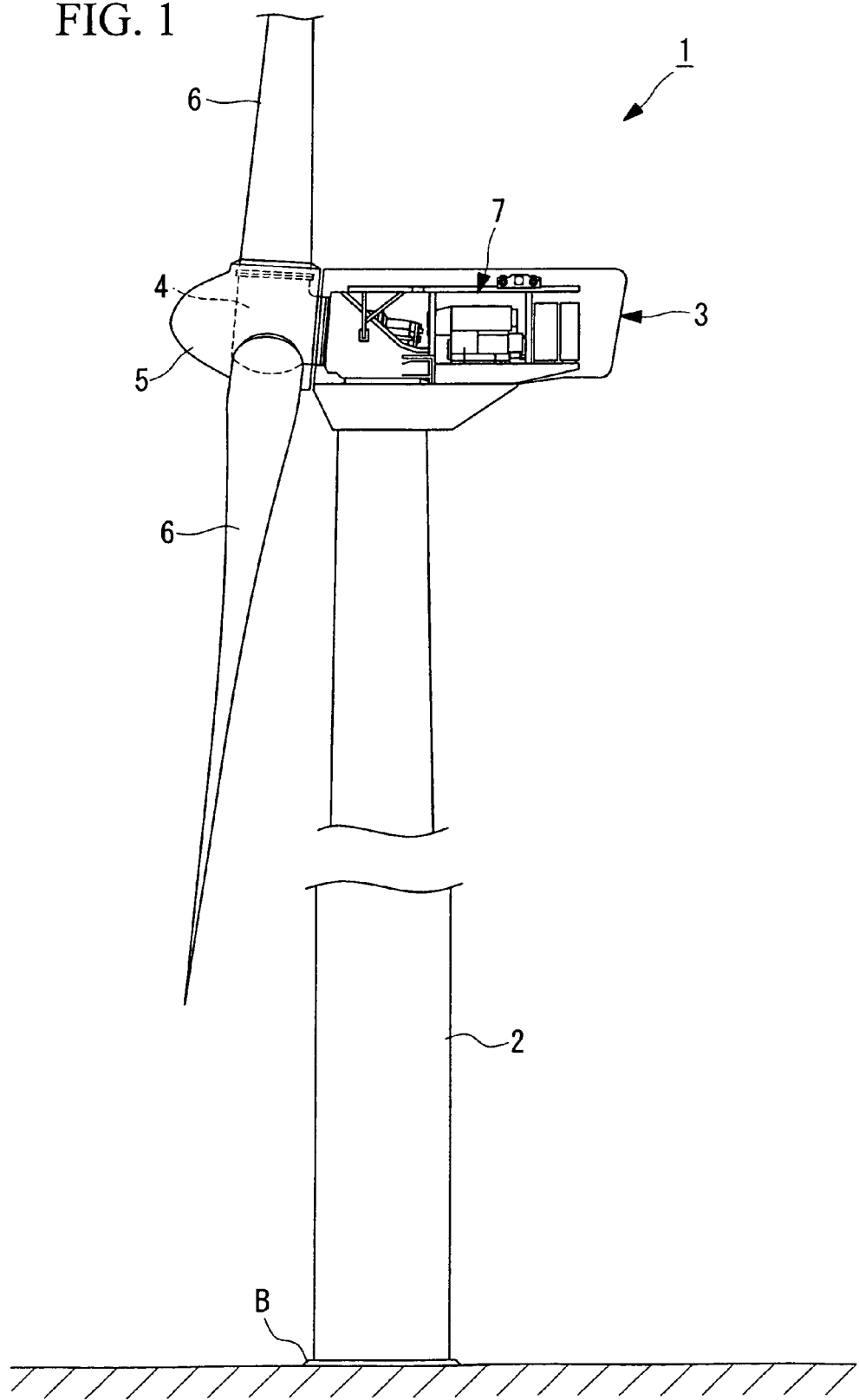
FIG. 1 is a side view illustrating, in outline, the entire structure of a wind turbine generator according to a first embodiment of the present invention.

1: wind turbine generator
4: rotor head
6: wind-turbine rotary blade
7: power facility
11: pitch drive device
12: cylinder
13: rod
14: cylinder bearing
15: rod bearing
16: trunnion

BEST MODE FOR CARRYING OUT THE INVENTION

Embodiments of the present invention will be described with reference to the drawings.

First Embodiment

A wind turbine generator according to a first embodiment of the present invention will be described with reference to FIGS. 1 to 5.

FIG. 1 is a side view illustrating, in outline, the entire structure of a wind turbine generator 1 according to this embodiment.

As shown in FIG. 1, the wind turbine generator 1 performs wind power generation. The wind turbine generator 1 includes a tower 2 vertically provided on a root B; a nacelle 3 disposed on the upper end of the tower 2; a rotor head 4 provided on the nacelle 3 in such a manner that it is rotatable around a substantially horizontal axis; a head capsule 5 covering the rotor head 4; a plurality of wind-turbine rotary blades 6 attached, in a radial pattern, around the rotational axis of the rotor head 4; and power facility 7 that performs power generation by the rotation of the rotor head 4.

As shown in FIG. 1, the tower 2 has a columnar structure extending upward (top of FIG. 1) from the root B and, for example, is constructed by connecting a plurality of units in the vertical direction.

The nacelle 3 is provided at the uppermost section of the tower 2. When the tower 2 is constructed of a plurality of units, the nacelle 3 is installed on the unit provided at the uppermost section.

As shown in FIG. 1, the nacelle 3 supports the rotor head 4 in a rotatable manner and accommodates the power facility 7 that performs power generation by the rotation of the rotor head 4.

The plurality of wind-turbine rotary blades 6 are attached to the rotor head 4 in a radial pattern around the rotational axis thereof, and the surrounding region is covered with the head capsule 5.

In this way, when wind strikes the wind-turbine rotary blades 6 from the rotational axis direction of the rotor head 4, a force causing the rotor head 4 to rotate around the rotation axis is generated at the wind-turbine rotary blades 6 and rotationally drives the rotor head 4.

This embodiment is described as being applied to an example in which three wind-turbine rotary blades 6 are provided. However, the number of wind-turbine rotary blades 6 is not limited to three. Two or more than three blades may be employed; it is not particularly limited.

Figure 2:
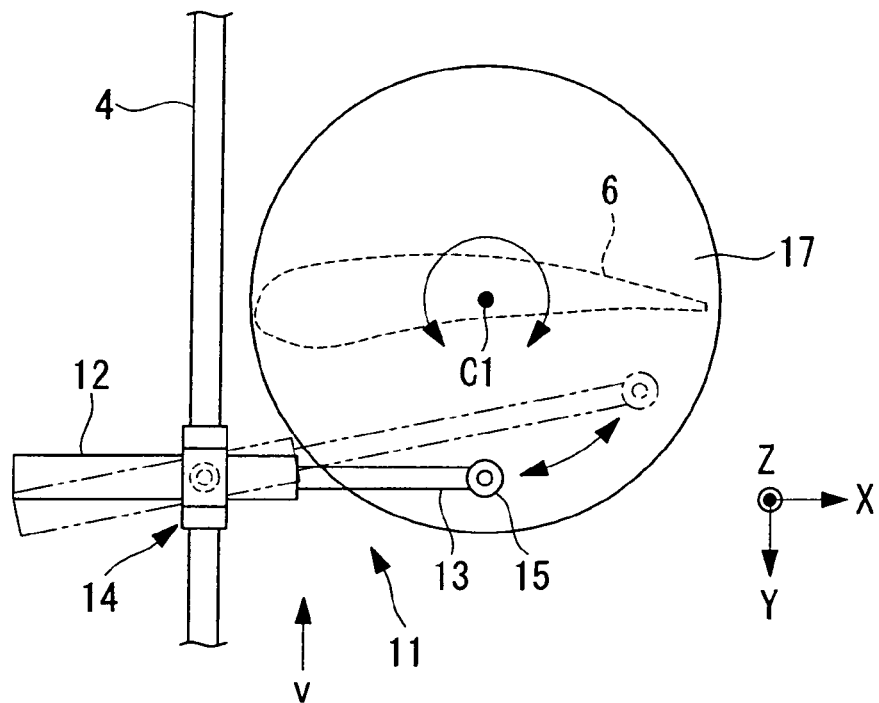
FIG. 2 is a schematic view illustrating the positional relationship between one pitch drive device and a wind-turbine rotary blade, illustrated in FIG. 1.
Figure 3:
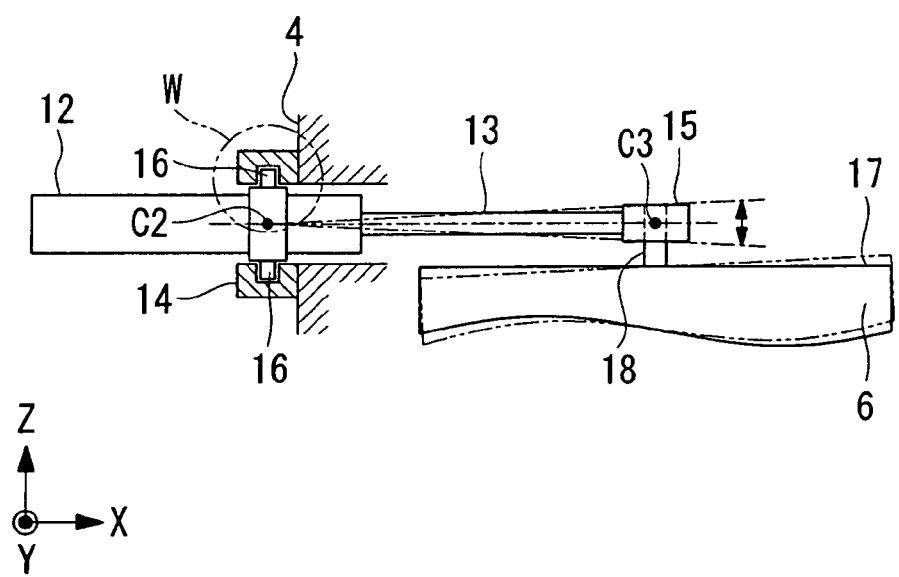
FIG. 3 is a V-view illustrating part of FIG. 2 in cross-section.
Figure 4:
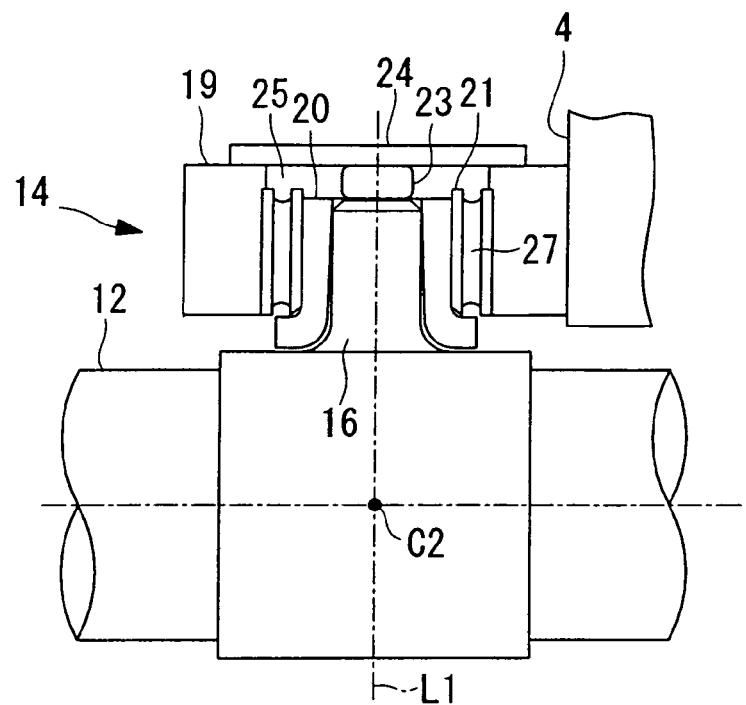
FIG. 4 is an enlarged side view of a W section in FIG. 3 in a magnified form.

FIG. 2 is a schematic view illustrating the positional relation between one pitch drive device 11 and a wind-turbine rotary blade 6. FIG. 3 is a V-view illustrating part of FIG. 2 in cross-section. FIG. 4 is an enlarged side view of a section W in FIG. 3 in a magnified form.

In the rotor head 4, a pitch drive device 11 that changes the pitch angle of the wind-turbine rotary blade 6 by rotating the wind-turbine rotary blade 6 around a axial center C1 of the wind-turbine rotary blade 6 is provided for each wind-turbine rotary blade 6 in a one-to-one fashion.

The pitch drive device 11 includes a cylinder 12, a rod 13 that extends from and retracts into the cylinder 12, a cylinder bearing 14 disposed between the rotor head 4 and the cylinder 12, and a rod bearing 15 disposed between the wind-turbine rotary blade 6 and the rod 13.

The cylinder 12 is a cylindrical member in which the rod 13 is disposed. By supplying a compressed fluid, such as oil, to the interior, the rod 13 is pushed out and retracted along the axis of the cylinder 12.

The cylinder 12 is provided with paired trunnions 16, which are cylindrical members extending from the cylindrical surface thereof in the axial direction of the wind-turbine rotary blade 6, i.e., the Z-axis direction.

The cylinder 12 is disposed, together with the rod 13, such that it extends substantially parallel to a surface substantially parallel to an end surface 17 of the wind-turbine rotary blade 6, i.e., the X-Y plane.

The rod 13 is a member formed in a columnar shape and is disposed substantially coaxially with the axis of the cylinder 12 in such a manner that it is linearly movable along the axis.

The rod bearing 15 is disposed at the end of the rod 13. A tower 18 is vertically disposed on the end surface 17 a certain distance away from the axial center C1 thereof. The rod bearing 15 is attached to the tower 18 in a turnable manner to absorb the turning around the Z-axis.

The rod bearing 15 may be constructed as a spherical bearing and, furthermore, may be capable of absorbing the turning around the X-axis and the Y-axis in the drawing.

The cylinder bearing 14 is a bearing that supports the paired trunnions 16 of the cylinder 12 in such a manner that they are turnable around the axis of the wind-turbine rotary blade 6, i.e., an inner axis L1 extending along the Z-axis.

As shown in FIG. 4, the cylinder bearing 14 has a bracket 19 secured to the rotor head 4, a bush 20 disposed surrounding the outer circumferential surface of the trunnion 16 and supporting it in a turnable manner, anti-vibration rubber (elastic support member) 21 disposed surrounding the outer circumferential surface of the bush 20, a thrust-receiving bush (thrust-receiving member) 23 disposed on the outer end of the trunnion 16, and a covering member 24 restricting the outward movement of the thrust-receiving bush 23.

The bush 20 and the anti-vibration rubber 21 constitute a support section for supporting the trunnion according to the present invention.

A through-hole 25 that receives the trunnion 16 is formed in the bracket 19. The hollow cylindrical anti-vibration rubber 21 is securely attached to the inner circumference of the through-hole 25. The hollow cylindrical bush 20, having a flange, is securely attached to the inner side of the anti-vibration rubber 21.

Figure 5:
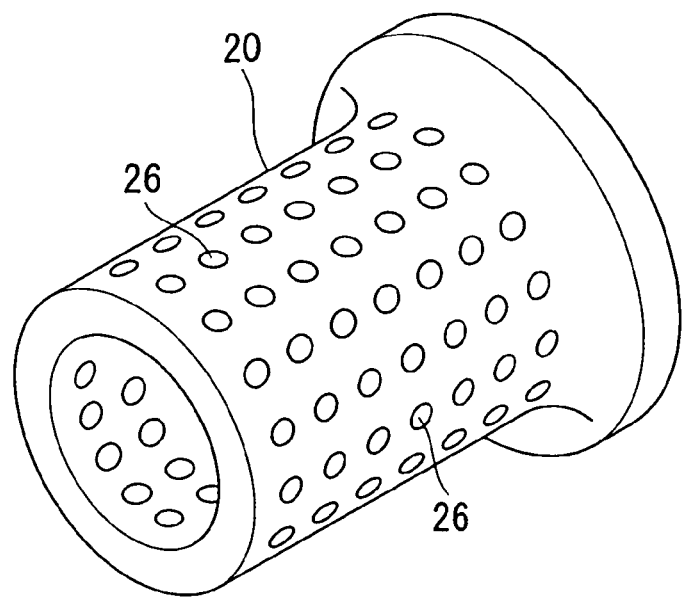
FIG. 5 is perspective view illustrating the structure of a bush in FIG. 4.

The bush 20 is formed of a copper alloy, and, as shown in FIG. 5, on the circumferential surface thereof, many black lead pieces 26 are embedded at substantially equal intervals in such a manner that they penetrate in the thickness direction.

The bush 20 receives and supports the trunnion 16 in a turnable manner. At this time, since the black lead pieces 26 provide a lubricating effect between them and the trunnion 16, the trunnion 16 slides smoothly.

A rubber layer 27 is provided in the anti-vibration rubber 21 at an intermediate position in the thickness direction and elastically supports the trunnion 16 with the bush 20.

The covering member 24 is securely attached to the bracket 19 so as to cover the outer edge of the through-hole 25.

The thrust-receiving bush 23 is disposed between the outer end of the trunnion 16 and the covering member 24.

The thrust-receiving bush 23 is pushed against the trunnion 16 by the covering member 24 and has a function for limiting the movement of the trunnion 16 in the direction of the inner axis L1.

As the power facility 7, for example, as shown in FIG. 1, one that is provided with a generator for performing power generation by receiving a rotational driving force of the rotor head 4 and a transformer for converting the power generated at the generator to a predetermined voltage may be employed.

Next, a power generation method of the wind turbine generator 1 having the above-described configuration will be described in outline.

In the wind-turbine generator 1, the wind power striking the wind-turbine rotary blades 6 from the rotational axis direction of the rotor head 4 is converted to motive energy causing the rotor head 4 to rotate around the rotational axis.

This rotation of the rotor head 4 is transmitted to the power facility 7. At the power facility 7, power corresponding to the target to which the electric power is to be supplied, for example, AC power having a frequency of 50 Hz or 60 Hz, is generated.

Here, at least while power is being generated, the rotor head 4 faces the wind by rotating the nacelle 3 appropriately in a horizontal plane so that the wind power effectively acts upon the wind-turbine rotary blades 6.

Next, pitch angle control of the wind-turbine rotary blade 6 by the pitch drive device 11 will be described.

As shown in FIG. 2, the pitch drive device 11 turns the wind-turbine rotary blade 6 around the axial center C1 to change its pitch angle by extending or retracting the rod 13 from or into the cylinder 12.

For example, when the rod 13 is extended from the cylinder 12, a force rotating the wind-turbine rotary blade 6 around the axis is generated since the end of the rod 13 is secured at a position away from the axial center C1 of the wind-turbine rotary blade 6.

When the wind-turbine rotary blade 6 rotates around the axial center C1, the position of the end of the rod 13 moves within the end surface 17, as represented by the two-dot chain line in FIG. 2, and therefore, the cylinder 12 and the rod 13 turn around the inner axis L1 by mean of the cylinder bearing 14. In other words, the trunnion 16 turns with respect into the bush 20.

At the same time, at the rod bearing 15, the rod 13 and the wind-turbine rotary blade 6 turn relative to each other around an axis substantially parallel to the Z-axis.

On the other hand, when the rod 13 is retracted into the cylinder 12, similar to the case described above, the wind-turbine rotary blade 6 turns around the axis, and the cylinder 12 and the rod 13 turn around the inner axis L1 by means of the cylinder bearing 14.

Next, absorption of relative deformation between the root of the wind-turbine rotary blade 6 and the rotor head 4 in the pitch drive device 11, which is a feature of this embodiment, will be described.

For example, when wind power is strong, causing the load on the wind-turbine rotary blade 6 to increase, deformation occurs at the root of the wind-turbine rotary blade 6, the rotor head 4, etc., as represented by the two-dot chain line in FIG. 3. In such a case, deformation occurs, rotating the end surface 17 of the wind-turbine rotary blade 6 around the Y-axis.

Consequently, the cylinder 12 and the rod 13, i.e., the trunnion 16, pivot around the Y-axis centered on an imaginary center point C2, which is an intersection point of the axis of the trunnion 16 and the inner axis L1, or, in other words, pivot in a direction intersecting the inner axis L1.

In this pivoting, the range in which an intersection point C3 of the axis of the rod 13 and the axis of the tower 18 moves around the center point C2 is small, i.e., within ±0.1 degrees.

The movement of the trunnion 16 is absorbed by the compression of the rubber layer 27 of the anti-vibration rubber 21. In other words, the force of the movement of the trunnion 16 is absorbed by elastic deformation of the rubber layer 27.

In this way, the force acting upon the cylinder 12 and the rod 13 caused by warpage generated at the attachment section of the rotor head 4 and the wind-turbine rotary blade 6 due to the wind power received by the wind-turbine rotary blade 6 can be absorbed by the rubber layer 27 of the anti-vibration rubber 21; therefore, wear progression at the sealed section, etc. of the cylinder 12 can be prevented, and the reliability of the pitch drive device 11 can be prevented from being impaired.

Moreover, since only the anti-vibration rubber 21 that elastically supports the trunnion 16 is provided on the cylinder bearing 14, the structure can be simplified and reduced in size and production costs can be reduced, compared with one using two pairs of trunnions.

When the rotor head 4 rotates, the cylinder 12 revolves around the axial center of the rotor head 4. During one revolution, the cylinder 12 revolves once around its own axial center.

Therefore, if there is a gap between the trunnion 16 or cylinder 12 and the bush 20, the trunnion 16 or the cylinder 12 periodically moves in this gap; therefore, the trunnion 16 or the cylinder 12 periodically collides with the bush 20.

Such periodical collision generates noise, and a collision force acts between the trunnion 16 or cylinder 12 and the bush 20.

This is significant in the direction of the inner axis L1 in which the gap is large compared with that in the direction intersecting the inner axis L1 in which relatively dense support is provided by the bush 20.

In this embodiment, since the outer end of the trunnion 16 is restricted from moving outward by the thrust-receiving bush 23, the trunnion 16 (cylinder 12) can be restricted from moving in the inner axis L1 direction with respect to the cylinder bearing 14 even when there is a gap between the trunnion 16 (cylinder 12) and the cylinder bearing 14.

Accordingly, since periodical collision of the trunnion 16 (cylinder 12) and the cylinder bearing 14 due to rotation of the rotor head 4 can be prevented, the generation of noise can be prevented, and the durability of the anti-vibration rubber 21 can be improved.

In this way, assembly tolerance that is required when assembling the pitch drive device 11 according to this embodiment can be relaxed even more.

For example, when the gap between the trunnion 16 (cylinder 12) and the cylinder bearing 14 is small and the effect of noise, etc. is small, the thrust-receiving bush 23 may be omitted.

Second Embodiment

Figure 6:
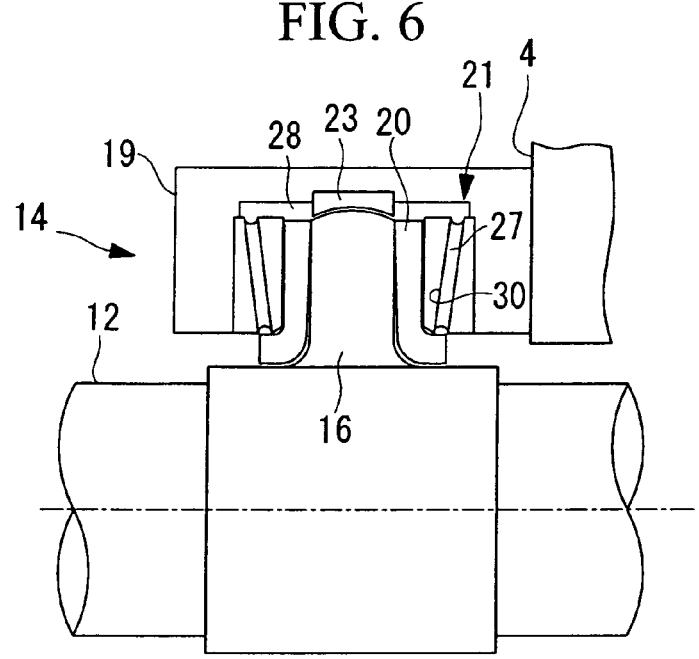
FIG. 6 is an enlarged side view illustrating, in cross-section, part of the same part of a wind turbine generator according to a second embodiment of the present invention illustrated in FIG. 4.

Next, a wind turbine generator 1 according to a second embodiment of the present invention will be described with reference to FIGS. 6 and 7.

In this embodiment, since the configuration of the anti-vibration rubber 21 differs from that according to the first embodiment, the sections that differ will be mainly described, and redundant descriptions of the sections that are the same as those of the above-described first embodiment will be omitted.

The members that are the same as those in the first embodiment will be represented by the same reference numerals.

In this embodiment, the rubber layer 27 of the anti-vibration rubber 21 has a truncated cone shape with a diameter that increases outward. Consequently, the inner circumferential surface (rubber surface) 30 of the rubber layer 27 inclines such that the diameter increases outward.

A depression 28 that receives the trunnion 16 is provided in the bracket 19. The thrust-receiving bush 23 is attached to the outer inner-circumferential surface of the depression 28.

The outer end of the trunnion 16 has a bent projected shape constituting part of a sphere. The inner surface of the thrust-receiving bush 23, which is a bent depressed shape, retracts the outer end of the trunnion 16 with substantially its entire surface. In this way, even when the trunnion 16 pivots around the center point C2, the thrust-receiving bush 23 can support the trunnion 16 with substantially its entire surface without causing the outer end of the trunnion 16 to be in biased retract; therefore, the movement of the trunnion 16 can be restricted in a stable manner.

Because the thrust-receiving bush 23 only needs to retract at least part of the outer end of the trunnion 16, its internal shape may be any appropriate shape.

Since the power generation method of the wind turbine generator 1 having such a configuration, the pitch angle control of the wind-turbine rotary blade 6, and the absorption of relative deformation of the root of the wind-turbine rotary blade 6 and the rotor head 4 in the pitch drive device 11 are the same as those according to the first embodiment, redundant descriptions thereof will be omitted here.

Due to relative deformation of the root of the wind-turbine rotary blade 6 and the rotor head 4 in the pitch drive device 11, the trunnion 16 obliquely moves around the center point C2 where the axis of the cylinder 12 and the inner axis L1 intersect.

Therefore, the outer end of the trunnion 16 moves the most. In other words, the movement of the trunnion 16 gradually increases from the inside to the outside.

Accordingly, the force from the trunnion 16 acting upon the rubber surface 30 of the anti-vibration rubber 21 inclines more towards the inside (cylinder 12 side) than in a direction orthogonal to the inner axis L1.

Since the inner circumferential surface 30 of the rubber layer 27 inclines such that the diameter increases outward, the force inclining inward from the trunnion 16 and acting upon the inner circumferential surface 30 of the rubber layer 27 can be supported efficiently.

Since the component of the force in the direction along the inner circumferential surface 30 of the rubber layer 27 decreases, the shearing force acting upon the anti-vibration rubber 21 can be reduced, and the durability of the anti-vibration rubber can be improved.

It is desirable to set the inclination angle of the inner circumferential surface 30 of the rubber layer 27 to an angle substantially orthogonal to the acting direction of the resultant force at the trunnion 16 due to various loads on the cylinder.

A conceptual example of such an angle will be described with reference to FIG. 7.

A center point P is an imaginary center point when the load (force) of the trunnion 16 acts upon the bush 20 (anti-vibration rubber 21). The trunnion 16 rotates around the Y-axis, i.e., rotates along a trajectory R around the Y-axis centered on the center point C2, due to the warpage that occurs at the attachment section of the rotor head 4 and the wind-turbine rotary blade 6.

For instance, warpage occurs at the attachment section of the rotor head 4 and the wind-turbine rotary blade 6 when adjusting the pitch angle of the wind-turbine rotary blade 6. In such a case, a force Fcy due to pulling and pushing the cylinder 12 and a force Fm accompanying the warpage acting to bend the cylinder 12 and the rod 13 act upon a center point S of the rod bearing 15.

At this time, a force Fg applied from the trunnion 16 to the anti-vibration rubber 21 is a resultant force of a force F1 applied from the trunnion 16 to the anti-vibration rubber 21 due to the force Fcy and a force F2 applied from the trunnion 16 to the anti-vibration rubber 21 due to the force Fm.

Since the force Fcy is received by two trunnions 16, the force F1 applied from one trunnion 16 to the anti-vibration rubber 21 is Fcy/2. When the distance between the center point C2 and the center point P is h and the distance between the center point C2 and the center point S is 1, the force F2 applied from the trunnion 16 to the anti-vibration rubber due to the force Fm is Fm(1/h). The acting direction of the force F2 is inward due to the inclination of the trunnion 16.

Therefore, the force Fg is Fcy/2+Fm(1/h).

Figure 7:
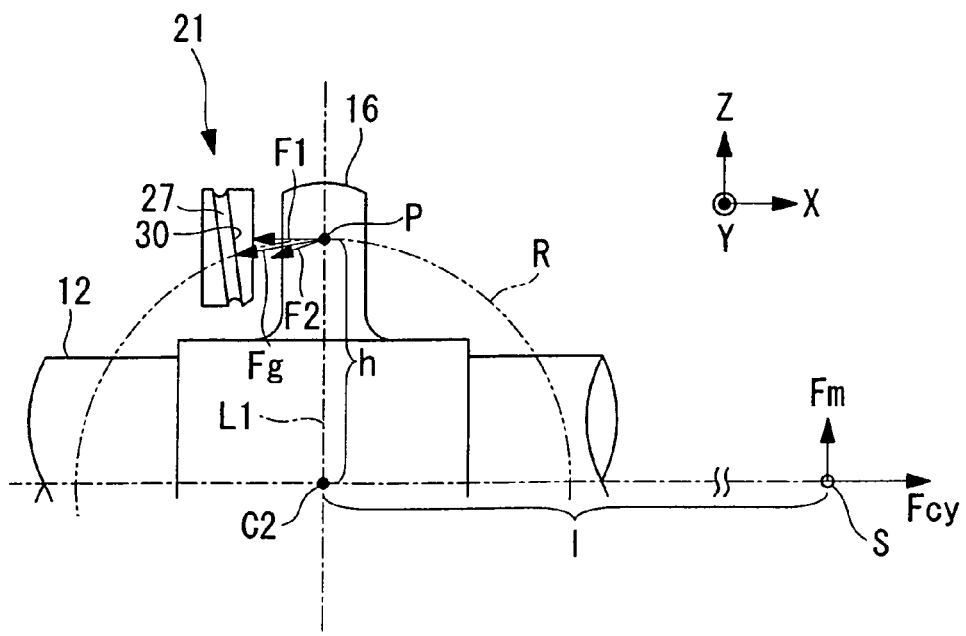
FIG. 7 is a schematic view illustrating the relationship between forces at a cylinder bearing shown in FIG. 6 due to deformation of a wind-turbine rotary blade

The acting direction of the force Fg is more inward than the direction orthogonal to the inner axis L1, as shown in FIG. 7.

It is desirable to incline the inner circumferential surface 30 of the rubber layer 27 so that it extends in a direction substantially orthogonal to the acting direction of the force Fg.

Since the acting direction of the force Fg changes when the load condition changes, an intermediate value of the acting direction of the expected force Fg may be used, or an acting direction expected to be most common may be used.

The inner circumferential surface 30 may be inclined so that it extends in a direction orthogonal to the trajectory R at the intersection point of the trajectory R and the inner circumferential surface 30.

The present invention is not limited to the embodiments described above and may be modified appropriately within the scope of the invention.

The invention claimed is:

1. A pitch drive device of a wind turbine generator, comprising:
    a cylinder configured to change a pitch angle by driving a wind-turbine rotary blade to turn around an axis with respect to a rotor head; and
    a cylinder bearing configured to support, in a turnable manner, a trunnion extending from the cylinder substantially parallel to an axis of the wind-turbine rotary blade,
    wherein the cylinder bearing comprises
        a bracket configured to be secured to the rotor head, and
        a support section configured to support the trunnion of the cylinder bearing,
    the support section comprises
        a bush disposed surrounding an outer circumferential surface of the trunnion, and supporting the trunnion in the turnable manner, and
        an elastic support member disposed surrounding an outer circumferential surface of the bush, the elastic support member being configured to elastically support the trunnion.

2. The pitch drive device of a wind turbine generator according to claim 1, wherein anti-vibration rubber is used as the elastic support member.

3. The pitch drive device of a wind-power generating apparatus according to claim 2, wherein an outward movement of an outer end of the trunnion is restricted by a thrust receiving member disposed between the outer end of the trunnion and a covering member which is attached to the bracket.

4. A wind-power generating apparatus, comprising:
    a plurality of wind-turbine rotary blades configured to receive wind power;
    the rotor head configured to support the wind-turbine rotary blades in such a manner that the wind-turbine rotary blades are turnable around an axis of the wind-turbine rotary blades and to be driven to turn by the wind-turbine rotary blades;
    the pitch drive device according to claim 3; and
    power generating equipment configured to perform power generation by a rotation of the rotor head.

5. A wind-power generating apparatus, comprising:
    a plurality of wind-turbine rotary blades configured to receive wind power;
    the rotor head configured to support the wind-turbine rotary blades in such a manner that the wind-turbine rotary blades are turnable around an axis of the wind-turbine rotary blades and to be driven to turn by the wind-turbine rotary blades;
    the pitch drive device according to claim 2; and
    power generating equipment configured to perform power generation by a rotation of the rotor head.

6. The pitch drive device of a wind turbine generator according to claim 2, wherein a rubber surface of the anti-vibration rubber inclines such that a diameter of the anti-vibration rubber increases outward.

7. The pitch drive device of a wind-power generating apparatus according to claim 6, wherein an outward movement of an outer end of the trunnion is restricted by a thrust receiving member disposed between the outer end of the trunnion and covering member which is attached to the bracket.

8. A wind-power generating apparatus, comprising:
a plurality of wind-turbine rotary blades configured to receive wind power;
the rotor head configured to support the wind-turbine rotary blades in such a manner that the wind-turbine rotary blades are turnable around an axis of the wind-turbine rotary blades and to be driven to turn by the wind-turbine rotary blades;
the pitch drive device according to claim 7; and
power generating equipment configured to perform power generation by a rotation of the rotor head.

9. A wind-power generating apparatus comprising:
a plurality of wind-turbine rotary blades configured to receive wind power;
the rotor head configured to support the wind-turbine rotary blades in such a manner that the wind-turbine rotary blades are turnable around an axis of the wind-turbine rotary blades and to be driven to turn by the wind-turbine rotary blades;
the pitch drive device according to claim 6; and
power generating equipment configured to perform power generation by a rotation of the rotor head.

10. The pitch drive device of a wind turbine generator according to claim 1, wherein an outward movement of an outer end of the trunnion is restricted by a thrust receiving member disposed between the outer end of the trunnion and a covering member which is attached to the bracket.

11. A wind-power generating apparatus comprising:
a plurality of wind-turbine rotary blades configured to receive wind power;
the rotor head configured to support the wind-turbine rotary blades in such a manner that the wind-turbine rotary blades are turnable around an axis of the wind-turbine rotary blades and to be driven to turn by the wind-turbine rotary blades;
the pitch drive device according to claim 10; and
power generating equipment configured to perform power generation by a rotation of the rotor head.

12. The pitch drive device of a wind turbine generator according to claim 10, wherein the outer end of the trunnion has a bent projected sphere shape,
an inner surface of the thrust receiving member has a bent depressed shape, and
a substantially entire surface of the outer end of the trunnion and a substantially entire surface of the inner surface of the thrust receiving member contact with each other.

13. A wind turbine generator comprising:
a plurality of wind-turbine rotary blades configured to receive wind power;
the rotor head configured to support the wind-turbine rotary blades in such a manner that the wind-turbine rotary blades are turnable around an axis of the wind-turbine rotary blades and to be driven to turn by the wind-turbine rotary blades;
the pitch drive device according to claim 1; and
power facility configured to perform power generation by a rotation of the rotor head.

14. The pitch drive device of a wind turbine generator according to claim 1, wherein the elastic support member comprises two layers sandwiching a rubber layer therebetween.

15. The pitch drive device of a wind turbine generator according to claim 14, wherein the bush has a plurality of lead pieces embedded on the outer circumferential surface thereof at substantially equal intervals.

16. The pitch drive device of a wind turbine generator according to claim 14, wherein the rubber layer has a truncated cone shape, and
a diameter of the rubber layer increases outward.

\* \* \* \* \*